United States Patent Office 3,565,919
Patented Feb. 23, 1971

3,565,919
PRODUCTION OF SUPPORTED CATALYSTS FOR PARTIAL OXIDATION OF AROMATIC HYDROCARBONS IN A FLUIDIZED BED
Wilhelm Friedrichsen, Ludwigshafen (Rhine), and Otto Goehre, Wilhelmsfeld, Germany, assignors to Badische Anilin- & Soda-Fabrik Aktiengesellschaft, Ludwigshafen (Rhine), Germany
No Drawing. Filed Sept. 6, 1968, Ser. No. 758,112
Claims priority, application Germany, Sept. 7, 1967, P 16 42 937.1
Int. Cl. B01j 11/06, 11/32
U.S. Cl. 260—346.4      3 Claims

ABSTRACT OF THE DISCLOSURE

The production of a supported catalyst containing vanadium pentoxide and titanium dioxide for the oxidation of aromatic hydrocarbons to carboxylic acids or their anhydrides with oxygen or gases containing oxygen in a fluidized bed, by treating an inert carrier substance with a solution or suspension of a titanium compound, then heating it in the presence of oxygen to a temperature of 130° to 1100° C., treating the carrier thus pretreated with a solution or melt of a vanadium compound and heating it in the presence of oxygen at 350° to 1100° C.

---

The present invention relates to a new process for the production of abrasion-resistant supported catalysts for the oxidation of aromatic hydrocarbons to carboxylic acids or carboxylic acid anhydrides with oxygen or gases containing oxygen in a fluidized bed.

It is known that for the oxidation of aromatic hydrocarbons in a fluidized bed there may be used as the catalyst a support having silica gel, alumina or titanium dioxide as carrier and vanadium pentoxide and potassium pyrosulfate as active substances, the active substances being applied to the carrier in the form of a melt. The disadvantage of these catalyst is that they are not adequately resistant to abrasion. Moreover they are not stable to sulfuric acid which is always formed when the oxidation reaction (as is often the case) is carried out in the presence of sulfur dioxide.

The object of the present invention is therefore to mitigate the disadvantages described.

We have now found that very active, abrasion-resistant supported catalysts containing titanium dioxide and vanadium pentoxide in the active substance, which are resistant to sulfuric acid, for the oxidation of aromatic hydrocarbons with oxygen or oxygen-containing gas in a fluidized bed are obtained when an inert carrier substance is treated with a solution or a suspension of a titanium compound, is then heated to a temperature of 130° to 1100° C. in the presence of oxygen and the carrier which has been given this pretreatment is then treated with a solution or melt of a vanadium compound and heated in the presence of oxygen at 350° to 1100° C.

Catalysts in accordance with the invention have a long life owing to their great abrasion resistance in industrial operation. The yield is also higher than when the carrier is treated simultaneously with titanium and vanadium compounds.

Absorbent substances such as silicic acid, silica gel, synthetic and natural silicates, for example aluminum or magnesium silicate, pumice, zeolites, clay fragments, alumina, magnesium oxide and zirconium oxide, may be used as carriers. The carrier substances may be used in a sintered condition provided they are still absorbent. Rutile is also suitable as a carrier. The absorptivity of the substances may be tested as follows: a mixture of water and a small amount of an alcohol is dripped into a measuring cylinder having a diameter of 12 mm. onto 10 g. of comminuted carrier while shaking until a liquid surface just forms on the grains. Generally from 5 to 12 cm.[3] or more is required. Only with rutile does a liquid surface form after only about 4 cm.[3] has been added. Substances tested by this method are generally suitable as carrier material if the amount of liquid used is more than 3 cm.[3].

The carrier substance is comminuted to a particle size which is suitable for fluidization, for example to a particle size of from 0.02 to 0.6 mm.

Treatment of the carrier material is carried out by impregnating it with a solution or suspension of a titanium compound, for example with a solution of titanium tetrachloride in alcohol or glacial acetic acid or an aqueous solution of titanium oxalate, tartrate, citrate or maleate. After having been impregnated, the particles are heated in the presence of oxygen (conveniently air) at temperatures of 130° to about 1100° C., preferably from 300° to 600° C., so that the titanium compound is converted into titanium dioxide, namely into the anatase modification. This pretreatment of the carrier material may if desired be carried out again in order to apply a fresh amount of titanium dioxide. It is also possible however to make the finely divided carrier substance into a paste with a soluble titanium compound, to spray it and to heat it. The pretreated catalyst should contain 1 to 80% particularly 6 to 60%, by weight of titanium dioxide.

The catalyst bearing titanium dioxide is then impregnated with an aqueous solution of a vanadium compound, for example a solution of the oxalates, formates, tartrates or sulfates of vanadium. It is also possible to use for the application of the active components a melt of ammonium thiocyanate into which the vanadium compounds are introduced.

Soluble titanium compounds may be applied to the pretreated carrier additionally to the vanadium compound. It is advantageous to apply titanium as an additional active component to the pretreated carrier after the latter to which titanium dioxide has been added has been heated to more than 800° C., for example to 900° to 1100° C.

The finished catalyst should contain 2 to 40%, particularly 4 to 30%, by weight of vanadium pentoxide. When titanium dioxide is used as an active component, the finished catalyst contains 2 to 50% by weight of titanium dioxide in the form of anatase and more than 3.5%, particularly more than 4%, by weight of vanadium pentoxide.

Thus for example 200 g. of granules of a silicate, such as magnesium silicate, may be suspended with 20% of anatase, mixed, dried, calcined at 1100° C., broken up and screened to a particle size of 0.05 to 0.5 mm. The particles are impregnated with an aqueous solution of titanium oxalate and vanadium oxalate whose concentration is equivalent to a content of 25% by weight of $TiO_2$ and 5% by weight of $V_2O_5$, dried and heated in a muffle furnace at 400° to 500° C. Impregnation of the carrier with the solution and also drying and/or heating in a muffle furnace may be repeated one or more times.

Heating of the finished catalyst may be carried out at temperatures of from 350° to 600° C., advantageously at 550° C., and for a duration of heating of half an hour to several hours. Other substances such as lithium oxide, zirconium oxide or cerium oxide, or tin, chromium, molybdenum and tungsten compounds may also be added to the catalyst. Iron, nickel, cobalt, silver and copper compounds may also be used as additives. These additives are used in an amount of from 0.01 to 10% by weight with reference to the total amount of catalyst. Smaller amounts of these substances are in general used than of vanadium pentoxide. Zirconium dioxide may however be added in larger amounts.

The catalyst according to this invention is particularly suitable, because of its abrasion resistance and good catalytic properties, for the oxidation of naphthalene or o-xylene to phthalic anhydride at 250° to 450° C. in a fluidized bed.

The invention is illustrated by the following examples.

EXAMPLE 1

140 cm.$^3$ of spherical particles of rutile having a mean diameter of 0.1 to 0.3 mm. which have been obtained by calcining anatase at 1200° C. for one hour is impregnated with a solution consisting of 7 cm.$^3$ of titanium tetrachloride, 100 cm.$^3$ of methanol and 30 cm.$^3$ of water, and dried at 150° C. in the presence of air. The balls are then treated with a solution formed from 21 g. of vanadyl oxalate and 39 g. of fused ammonium thiocyanate, after they have been cooled and diluted with 70 cm.$^3$ of acetone. After the pretreated balls have absorbed this solution they are heated in the presence of air for two hours at 250° C. and then for another two hours at 450° C. in a muffle furnace.

The catalyst thus prepared is charged into a refractory tube provided with external heating and having a length of 1 meter and an internal diameter of 30 mm. and containing porcelain spheres having a diameter of 9 mm. are situated. 74.5 g. of vaporous 98% o-xylene with 1050 liters of air are passed through this catalyst layer at 420° C. per hour. After having passed through the vigorously fluidized bed of catalyst, the vapor leaving the tube is condensed. 78.5 g. of phthalic anhydride and 3.3 g. of maleic anhydride are obtained per hour. The yield is 77% of the theory. When the same experiment is carried out under the same conditions with a catalyst which has not been pretreated with titanium tetrachloride solution, a yield of 65% of the theory is obtained.

EXAMPLE 2

90 g. of spherical silica gel is impregnated with a solution of 86 g. of titanium tetrachloride in 20 cm.$^3$ of methanol and 60 cm.$^3$ of water (prepared by cooling), dried at 150° C. and heated for two hours at 500° C. A solution of 22 g. of vanadyl oxalate in 44 g. of molten ammonium thiocyanate (which has been diluted with 130 cm.$^3$ of acetone after it has cooled) is allowed to soak into the catalyst. The pretreated and impregnated catalyst is heated for three hours at 250° C. and then heated at 450° C. in a muffle furnace for two hours. An abrasion-resistant catalyst having a bulk density of 0.74 is obtained.

150 cm.$^3$ of this catalyst is charged as described in Example 1 into a reaction tube and contacted at 400° C. with 50 g. per hour of 98% o-xylene and 1000 liters of air. 51.3 g. of phthalic anhydride and 2.2 g. of maleic anhydride are obtained per hour, which is equivalent to a yield of 74.9% of the theory.

If the silica gel is not pretreated with titanium tetrachloride, there is no phthalic anhydride in the reaction product.

EXAMPLE 3

150 cm.$^3$ of a carrier prepared from fragments of clay and having a mean particle size of from 0.1 to 0.4 mm. diameter is impregnated with a solution of 14 cm.$^3$ of titanium tetrachloride in 50 cm.$^3$ of glacial acetic acid. After the glacial acetic acid has been distilled off in vacuo, the pretreated carrier is dried at 140° C., heated for two hours at 600° C. and then brought into contact with a solution of 22 g. of vanadyl oxalate in 50 cm.$^3$ of form-amide. Excess solution is evaporated by heating to 200° C. and the catalyst is heated in a muffle furnace for three hours at 450° C.

150 cm.$^3$ of this catalyst is contacted in a reaction tube as described in Example 1 with 65 g. of 98% o-xylene and 1000 liters of air per hour at 420° C. 66.3 g. of phthalic anhydride and 1.6 g. of maleic anhydride are obtained per hour. The yield is 74.5% of the theory.

When the carrier has not been pretreated with the titanium solution, the yield of phthalic anhydride is only 45% of the theory.

We claim:
1. A supported catalyst which is a product obtained by the process comprising:
   (a) first impregnating an inert absorbent carrier material having a particle size of 0.02 to 0.6 mm. with a solution or suspension of an oxidizable titanium compound followed by heating the thus impregnated material in the presence of oxygen at 130° C. to 600° C.; and
   (b) then impregnating the product of (a) with a solution or melt of an oxidizable vanadium compound followed by heating the thus impregnated product in the presence of oxygen at 350° C. to 600° C., such that the catalyst contains 20 to 94% by weight of said inert absorbent carrier material, 2 to 50% by weight of titanium dioxide and 4 to 30% by weight of vanadium pentoxide, the percentages by weight taken with reference to the total amount of catalyst.

2. A supported catalyst as claimed in claim 1 wherein the absorbent carrier material is selected from the group consisting of silica gel, aluminum or magnesium silicates, rutile, pumice, zeolites, clay fragments, alumina, magnesium oxide and zirconium oxide.

3. In a process for the continuous catalytic oxidation of an aromatic hydrocarbon into carboxylic acids or their anhydrides with an oxygen-containing gas in a fluidized bed of a supported titanium/vanadium catalyst at an elevated temperature, the improvement of carrying out said catalytic reaction in contact with fluidized particles of a catalyst consisting essentially of the product obtained by the process comprising
   (a) first impregnating an inert absorbent carrier material having a particle size of 0.02 to 0.6 mm. with a solution or suspension of an oxidizable titanium compound followed by heating the thus impregnated material in the presence of oxygen at 130° C. to 600° C.; and
   (b) then impregnating the product of (a) with a solution or melt of an oxidizable vanadium compound followed by heating the thus impregnated product in the presence of oxygen at 350° C. to 600° C., such that the catalyst contains 20 to 94% by weight of said inert absorbent carrier material, 2 to 50% by weight of titanium dioxide and 4 to 30% by weight of vanadium pentoxide, the percentages by weight taken with reference to the total amount of catalyst.

References Cited

UNITED STATES PATENTS

| 3,464,930 | 9/1969 | Friedrichsen | 252—469 |
| 3,177,229 | 4/1965 | Leak | 260—346.4 |
| 3,055,842 | 9/1962 | Robinson | 252—461 |

DANIEL E. WYMAN, Primary Examiner

P. M. FRENCH, Assistant Examiner

U.S. Cl. X.R.

252—461, 464, 469, 546; 260—533